(12) United States Patent
Proctor et al.

(10) Patent No.: US 7,795,828 B2
(45) Date of Patent: Sep. 14, 2010

(54) BACK ELECTRO-MOTIVE FORCE (BEMF) COMMUTATION AND SPEED CONTROL OF A THREE-PHASE BRUSHLESS DC (BLDC) MOTOR

(75) Inventors: Robert Proctor, Durham, NC (US); Kevin P. King, Timberlake, NC (US); Yashvant Jani, San Jose, CA (US)

(73) Assignee: Renesas Electronics America Inc., San Clara, CA (US)

( * ) Notice: Subject to any disclaimer, the term of this patent is extended or adjusted under 35 U.S.C. 154(b) by 385 days.

(21) Appl. No.: 12/056,755

(22) Filed: Mar. 27, 2008

(65) Prior Publication Data
US 2009/0230905 A1 Sep. 17, 2009

Related U.S. Application Data

(60) Provisional application No. 61/036,797, filed on Mar. 14, 2008.

(51) Int. Cl.
*H02P 6/18* (2006.01)
(52) U.S. Cl. ............................ 318/400.28; 318/400.09; 318/400.34; 318/400.35
(58) Field of Classification Search ............ 318/400.01, 318/400.06, 400.09, 400.11, 400.13, 400.26, 318/400.27, 400.28, 400.32, 400.34, 400.35, 318/400.36, 724
See application file for complete search history.

(56) References Cited

U.S. PATENT DOCUMENTS 5,245,256 A * 9/1993 Cassat et al. ........... 318/400.35

(Continued)

OTHER PUBLICATIONS

Elliott, Charlie et al., "Using the dsPIC30F for Sensorless BLDC Control", Microchip Technology Inc. Technical Paper, AN901, pp. 1-36, Jan. 8, 2004.
Powerex, Inc., "High Voltage Input DC-to-DC Converter", Data Sheet M57184N-715B, pp. 1-4, Oct. 2005.

(Continued)

*Primary Examiner*—Bentsu Ro
(74) *Attorney, Agent, or Firm*—Squire, Sanders & Dempsey, L.L.P.

(57) ABSTRACT

A DC motor comprises a stator having at least three windings coupled to a neutral point; a first pair of upper and lower switches for driving a first winding of the at least three windings to a first voltage or in tristate; a second pair of upper and lower switches for driving a second winding of the at least three windings to a second voltage or in tristate; a third pair of upper and lower switches for driving a third winding of the at least three windings to a third voltage or in tristate, one of the first, second or third windings being in tristate; a back electromotive force (BEMF) signal generation circuit coupled to receive a BEMF voltage from the winding in tristate; a comparator coupled to receive the BEMF voltage and a zero-crossing voltage representing the voltage at the neutral point at a predetermined time and for comparing the BEMF voltage and the zero-crossing voltage to generate a comparison result; a zero-crossing voltage generation circuit to output the zero-crossing voltage to the comparator; and a commutation controller coupled to receive the comparison result and a speed control signal and for using the comparison result and the speed control signal to generate complementary pulse width modulated (PWM) control signals, one of the complementary PWM control signals for controlling an upper switch and the other of the complementary PWM control signals for substantially simultaneously controlling a lower switch.

20 Claims, 12 Drawing Sheets

U.S. PATENT DOCUMENTS

| | | | | |
|---|---|---|---|---|
| 5,581,169 | A | * | 12/1996 | Kerkman et al. ............. 318/811 |
| 5,621,292 | A | * | 4/1997 | Kokura et al. ................ 318/599 |
| 5,821,707 | A | * | 10/1998 | Kim ....................... 318/400.01 |
| 6,124,688 | A | * | 9/2000 | Coles et al. ............ 318/400.09 |
| 7,288,916 | B2 | * | 10/2007 | Mitsuki ....................... 318/723 |
| 2009/0128072 | A1 | * | 5/2009 | Strong et al. ........... 318/400.17 |

OTHER PUBLICATIONS

Voultoury, Pierre, "Sensorless Speed Controlled Brushless DC Drive using the TM320C242 DSP Controller", Texas Instruments, Application Report SPRA498, pp. 1-17, Dec. 1998.

Yedamale, Padmaraja, "Brushless DC (BLDC) Motor Fundamentals", Microchip Technology Inc. Technical Paper, AN885, pp. 1-20, Jul. 28, 2003.

* cited by examiner

Positive phase output
Inverted phase output

Inductive Kick

Current Decay

A = 500mV   2ms   Trig: A ↑   B = 5A

US 7,795,828 B2

BACK ELECTRO-MOTIVE FORCE (BEMF) COMMUTATION AND SPEED CONTROL OF A THREE-PHASE BRUSHLESS DC (BLDC) MOTOR

PRIORITY CLAIM

This application claims priority to U.S. Provisional Patent Application Ser. No. 61/036,797 by inventors Jani, Proctor and King on Mar. 14, 2008 entitled "Back Electro-Motive Force (BEMF) Commutation and Speed Control of a Three-Phase Brushless DC (BLDC) Motor", which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to motors, and is more specifically related to a system and method for back electromotive force (BEMF) detection in a brushless DC (BLDC) motor.

BACKGROUND

While conventional brush-commutated DC motors have advantageous characteristics such as convenience of controlling operational speeds, brush-commutated DC motors suffer from brush wear, electrical noise and/or RF interference. These disadvantages limit the life and applicability of brush-commutated DC motors. Accordingly, electronically commutated brushless DC (BLDC) motors have been developed.

BLDC motors have many high and low speed applications. Conventional high speed applications include spindle motors for computer hard disk drivers, digital video disk (DVD) drivers, CD players, tape-drives for video recorders, and blowers for vacuum cleaners. Low speed applications include motors for farm and construction equipment, HVAC compressors, and fuel pumps.

FIG. 1 is a block diagram of a prior art sensorless BLDC motor 100. As shown, a stator 105 has three windings U, V and W connected 120 degrees apart in a "Wye" or "Y" configuration. A set of driving transistors 110 drive the voltage of each winding to cause a rotating electromagnetic field, thus causing the rotor (not shown) to rotate about the stator 105. Specifically, the windings are sequentially energized to produce a rotating current path through two of the windings, leaving the third winding in tristate. The six commutation phases or steps are defined as described by the following sequence:

| | Time: | | | | | |
|---|---|---|---|---|---|---|
| | T1 | T2 | T3 | T4 | T5 | T6 |
| Upper Transistor: | S1 | S1 | S5 | S5 | S3 | S3 |
| Lower Transistor: | S6 | S4 | S4 | S2 | S2 | S6 |

So that the phases can be switched and the flux in the stator 105 can be controlled at the proper times, the position of the rotor must be monitored. If the rotor and flux lose synchronization, the rotor will be less efficient, start to jitter, or stop rotating.

To monitor rotor position, a sensorless BLDC motor 100 takes advantage that, when the rotor is rotating, a back electro-motive force (BEMF) voltage is induced in each winding, including in the winding in tristate. Assuming that the windings have equal impedance, it is generally assumed that the BEMF voltage on the winding in tristate will be half way between the voltage across the other two windings when the rotor is transitioning. This point is referred to as the "zero-crossing." Accordingly, when the BEMF voltage of the winding in tristate is equal to the voltage half way between the voltage across the other two windings, the BLDC motor 100 advances the commutation sequence by one step, e.g., 60 degrees. Known techniques of detecting BEMF include comparing the voltage on the winding in tristate against the voltage at the neutral point NP (the point at which all three windings connect) or against a neutral point voltage managed by a resistor network.

To control the speed of the rotor, the motor 100 uses pulse width modulation (PWM). PWM is a nonlinear supply of power, during which the power being supplied to one of the upper or lower transistors 110 is switched on and off according to a pattern. By modifying the pattern, e.g., the percentage of "on" time of the transistor, the motor 100 can control the speed of rotation.

When using PWM, it has been recognized that the application of PWM causes the neutral point voltage to deviate. For example, when applying PWM to the upper transistors 110 and a full voltage to the lower transistors 110, the zero-crossing voltage becomes a value lower than ½ VBUS. When applying PWM to the lower transistors 110 and a full voltage to the upper transistors 110, the zero-crossing voltage becomes a value greater than ½ VBUS. When alternating the application of PWM between the upper and lower transistors, the zero-crossing voltage alternates between the value lower than ½ VBUS and the value higher than ½ VBUS. For example, if at 100% PWM the zero-crossing voltage is at ½ VBUS (e.g., 2.5V), then at 60% PWM the zero-crossing voltage may be affected, e.g., 60% of 2.5V or 1.5V. Mathematical computations to calculate the zero-crossing voltage are well known. Resistor network and filter circuits used to detect the BEMF cannot be changed on the fly to accommodate this deviation from ½ VBUS.

One shortcoming of BEMF sensing stems from the fact that the BEMF voltage is directly proportional to motor speed (and phase angle related to the shaft angle). Accordingly, only when the rotor has reached sufficient speed, e.g., around 50-60% of full speed, will the generated BEMF voltage be sufficiently large to be detected. Unfortunately, the inability to precisely detect the BEMF voltage at lower speeds can lead to rotor position inaccuracies and loss of synchronization. Thus, the prior art BLDC motor 100 cannot use BEMF detection to control the motor 100 at relatively low speeds. Accordingly, to start a BLDC motor 100, the conventional BLDC motor 100 accelerates in an "open loop" mode, applying commutation signals at a rate designed to approximate the acceleration characteristics of a given motor/load combination, until the motor 100 reaches a sufficient speed. Then, upon reaching sufficient speed, the conventional BLDC motor 100 switches to using BEMF voltage to control commutation.

SUMMARY

In one embodiment, a sensorless BLDC motor includes dual PWM signals to control upper and lower switches (e.g., driving transistors) that control the rotation of the electromagnetic field produced by the stator. By applying dual PWM control signals to the upper and lower switches, the sensorless BLDC motor can be controlled using BEMF detection at lower speeds, e.g., at 15% of full speed.

In one embodiment, the present invention provides a DC motor, comprising a stator having at least three windings coupled to a neutral point; a first pair of upper and lower switches for driving a first winding of the at least three windings to a first voltage or in tristate; a second pair of upper and lower switches for driving a second winding of the at least three windings to a second voltage or in tristate; a third pair of upper and lower switches for driving a third winding of the at least three windings to a third voltage or in tristate, one of the first, second or third windings being in tristate; a back electromotive force (BEMF) signal generation circuit coupled to receive a BEMF voltage from the winding in tristate; a comparator coupled to receive the BEMF voltage and a zero-crossing voltage representing the voltage at the neutral point at a predetermined time and for comparing the BEMF voltage and the zero-crossing voltage to generate a comparison result; a zero-crossing voltage generation circuit to output the zero-crossing voltage to the comparator; and a commutation controller coupled to receive the comparison result and a speed control signal and for using the comparison result and the speed control signal to generate complementary pulse width modulated (PWM) control signals, one of the complementary PWM control signals for controlling an upper switch and the other of the complementary PWM control signals for substantially simultaneously controlling a lower switch.

For the above motor, the first voltage may be one of a low or a high voltage, the second voltage may be one of the low or the high voltage, and the third voltage may be one of the low or the high voltage. The first winding, the second winding and the third winding may each have the same impedance. The predetermined time may be the time when zero-voltage is being driven across the winding in tristate. The first winding may be driven by a high voltage, the second winding may be driven by a low voltage, the first winding, the second winding and the third winding may each have the same impedance, and the zero-crossing voltage may be defined as approximately ½ the voltage across the first winding and the second winding. The complementary PWM control signals may have substantially 100% duty across them at all times. The complementary PWM control signals may have a difference in duty relative to the speed control signal. The zero-crossing voltage may be determined from an empirically generated chart. The commutation controller may apply PWM control signals to the upper and lower switches substantially symmetrically for a given speed, thus causing switch wear to be substantially equal to all switches. The DC motor may further comprise an open loop commutation controller for controlling the first pair of switches, the second pair of switches, and the third pair of switches until the BEMF voltage is sufficient for the BEMF detection circuit to detect.

In one embodiment, in a DC motor with a stator having at least three windings coupled to a neutral point, the present invention provides a method comprising driving a first winding of the at least three windings to a first voltage or in tristate by a first pair of upper and lower switches; driving a second winding of the at least three windings to a second voltage or in tristate by a second pair of upper and lower switches; driving a third winding of the at least three windings to a third voltage or in tristate by a third pair of upper and lower switches, one of the first, second or third windings being in tristate; receiving a back electro-motive force (BEMF) voltage from the winding in tristate; receiving a zero-crossing voltage representing the voltage at the neutral point at a predetermined time; comparing the BEMF voltage and the zero-crossing voltage to generate a comparison result; receiving a speed control signal; using the comparison result and the speed control signal to generate complementary pulse width modulated (PWM) control signals; using one of the complementary PWM control signals to control an upper switch; and using the other of the complementary PWM control signals to substantially simultaneously control a lower switch.

For the above method, the first voltage may be one of a low or a high voltage, the second voltage may be one of the low or the high voltage, and the third voltage may be one of the low or the high voltage. The first winding, the second winding and the third winding may each have the same impedance. The predetermined time may be the time when zero-voltage is being driven across the winding in tristate. The first winding may be driven by a high voltage, the second winding may be driven by a low voltage, the first winding, the second winding and the third winding may each have the same impedance, and the zero-crossing voltage may be defined as approximately ½ the voltage across the first winding and the second winding. The complementary PWM control signals may have substantially 100% duty across them at all times. The complementary PWM control signals may have a difference in duty relative to the speed control signal. The zero-crossing voltage may be determined from an empirically generated chart. The method further comprises applying the PWM control signals to the upper and lower switches substantially symmetrically for a given speed, thus causing switch wear to be substantially equal to all switches. The method further comprises controlling the first pair of switches, the second pair of switches, and the third pair of switches using an open loop commutation controller until the BEMF voltage is sufficient for the BEMF detection circuit to detect.

DETAILED DESCRIPTION

The following description is provided to enable any person skilled in the art to make and use the invention. Various modifications to the embodiments are possible, and the generic principles defined herein may be applied to these and other embodiments and applications without departing from the spirit and scope of the invention. Thus, the invention is not intended to be limited to the embodiments and applications shown, but is to be accorded the widest scope consistent with the principles, features and teachings disclosed herein.

Figure 1:
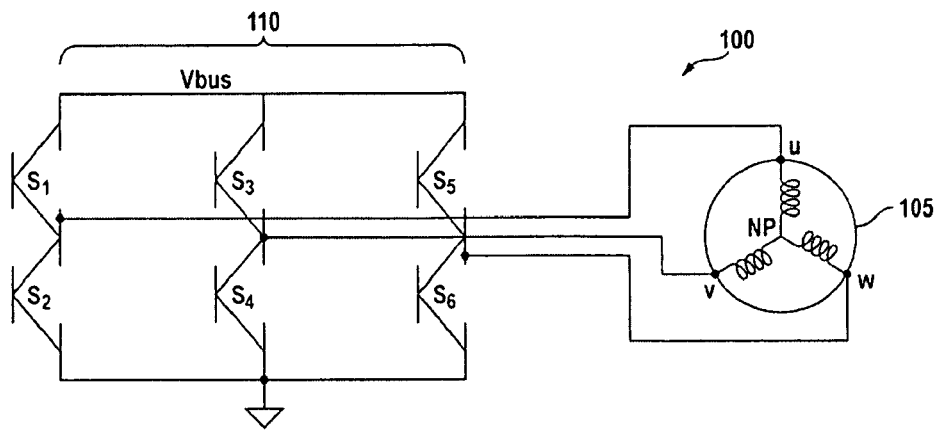
FIG. 1 is a block diagram of a prior art sensorless BLDC motor.
Figure 2:
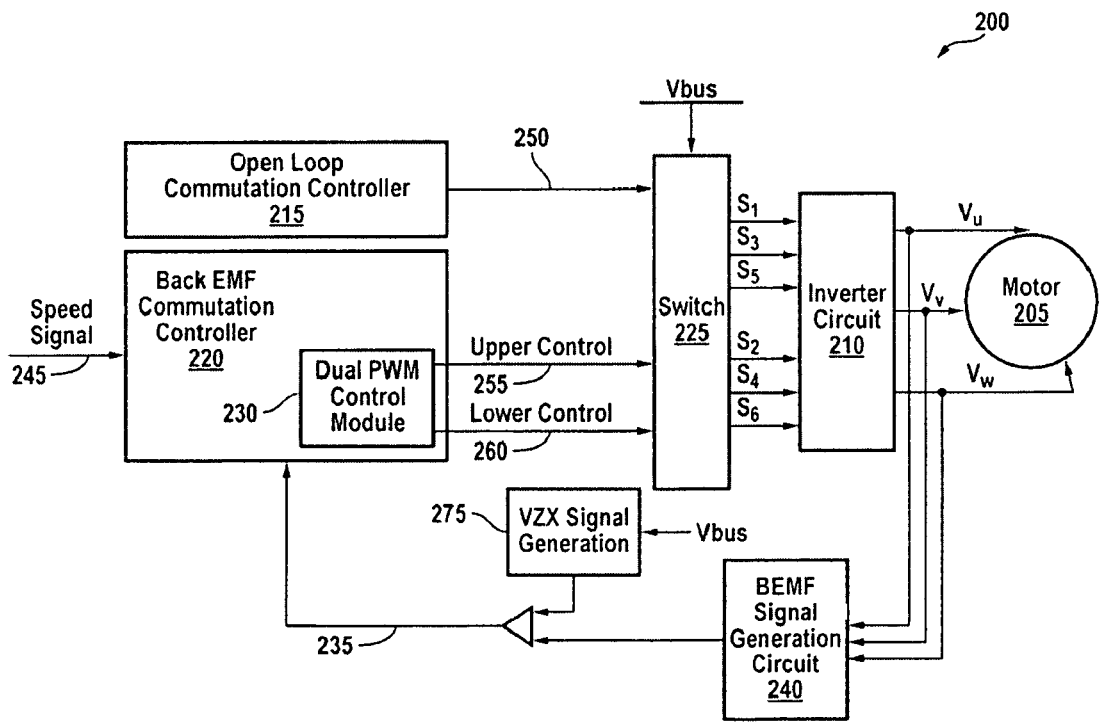
FIG. 2 is a block diagram of a sensorless BLDC motor with dual PWM control, in accordance with an embodiment of the present invention.

FIG. 2 is a block diagram of a sensorless BLDC motor 200 with dual pulse width modulated (PWM) control, in accordance with an embodiment of the present invention. Generally, the sensorless BLDC motor 200 includes dual PWM signals to control upper and lower switches (e.g., driving transistors of inverter circuit 210) that control the rotation of the electromagnetic field produced by the stator 205. By applying dual PWM control signals to the upper and lower switches, the sensorless BLDC motor 200 can be controlled using BEMF detection at lower speeds, e.g., at 15% of full speed.

The sensorless BLDC motor 200 includes a stator 205 with three windings U, V and W in a "Y" configuration. The windings U, V and W of the stator 205 are coupled to receive electronic commutation driving signals from inverter circuit 210 and are coupled to provide BEMF feedback signal Vu, Vv and Vw to a BEMF signal generation circuit. The BEMF signal generation circuit determines the voltage VBEMF on the winding in tristate, and forwards the voltage VBEMF to a comparator 235. The comparator 235 compares the VBEMF against a zero-crossing voltage VZX generated by a VZX signal generator 275. In one embodiment, when the voltage VBEMF is higher than the voltage VZX, the comparator 235 output signal is high. When the voltage VBEMF is lower than the voltage VZX, the comparator 235 output signal is low. One can use an inverting comparator 235 or can reverse the inputs on the comparator 235 if another configuration is more suitable.

The comparator 235 forwards the results of its comparison to a BEMF commutation controller 220. The BEMF commutation controller 220 includes a dual PWM control module 230, which is configured to generate upper transistor PWM control signals for controlling the upper driving transistors S1, S3 and S5, and to generate lower transistor PWM control signals for controlling the lower driving transistors S2, S4 and S6. It will be appreciated that the terms "upper" and "lower" do not necessarily represent physical position but instead may represent connection relative to the supply voltage. Further, although each of the upper driving transistors of the inverter circuit 210 is coupled to the same high supply voltage, e.g., VBUS, and each of the lower driving transistors of the inverter circuit 210 is coupled to the same low supply voltage, e.g., ground, one skilled in the art will recognize that the upper and/or lower transistors may be coupled to independent and/or different supply voltages. Computation of the upper and lower PWM control signals (FIG. 4) is described in greater detail with reference to zero-crossing voltage VZX as shown in FIG. 3.

A switch 225 receives the upper and lower transistor PWM control signals over communication lines 255 and communication lines 260, respectively, from the BEMF commutation controller 220. The switch 225 also receives open loop control signals over communication lines 250 from an open loop commutation controller 215. Based on the operating speed, the switch 225 selects either the open loop control signals from the open loop commutation controller 215 or the dual PWM control signals from the BEMF commutation controller 220 to control the driving transistors of the inverter circuit 210. As described above and in greater detail below, by providing dual PWM control signals to the inverter circuit 210, motor speed can be controlled using the BEMF commutation controller 245 at low speeds.

In one embodiment, the motor control circuit (e.g., everything to the left of the motor 205) may be built using the Renesas YMCRPR8C25 motor control evaluation kit. One example implementation is shown in the circuit schematics of FIGS. 11-14.

Figure 3:
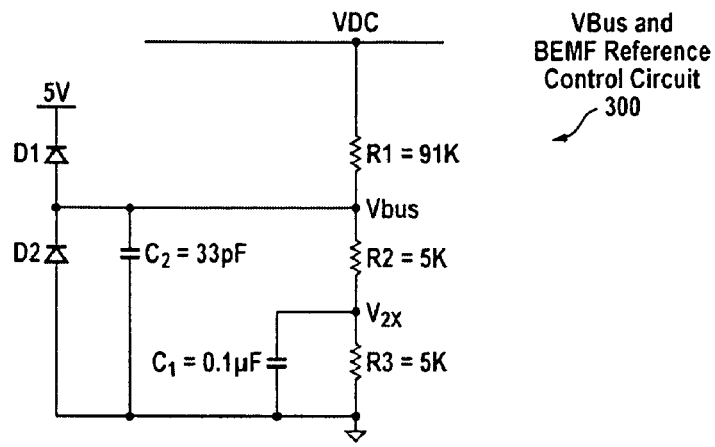
FIG. 3 is a block diagram of a control circuit for generating VBUS and the BEMF reference, in accordance with an embodiment of the present invention.

FIG. 3 is a block diagram of a VBUS and BEMF reference control circuit 300, in accordance with an embodiment of the present invention. Control circuit 300 is configured to generate the voltage VBUS for powering the driving transistors of the inverter circuit 210 and to generate the zero-crossing voltage VZX.

In one embodiment, control circuit 300 includes three resistors R1, R2 and R3 in series from a DC voltage VDC, e.g., 24V, to ground. For example, R1 may be 90KΩ (or 91KΩ for resistor convenience), R2 may be 5KΩ, and R3 may be 5KΩ. Accordingly, the voltage VBUS at the point between resistor R1 and resistor R2 will be generated by voltage dividing from the voltage VDC, e.g., to $1/10^{th}$ of the voltage VDC. This point may be clamped with schottky diodes to ground and +5V and filtered with a capacitor C2 (e.g., 33 pF) to ground. The zero-crossing voltage VZX is obtained from the point between resistor R2 and R3. When R2 and R3 are equal in size, e.g., each equal to 5KΩ, the zero-crossing voltage at this point will be produced by voltage dividing the voltage VBUS to ½ VBUS. Accordingly, since VBUS is typically scaled to 5V at this point, the point between R2 and R3 is commonly referred to VBUS_2.5 (since it is typically scaled to 2.5V). VBUS_2.5 may be filtered with a capacitor C1 (e.g., 0.1 uF) to ground.

Applying the example resistor values indicated above, the control circuit 300 may be aligned to a maximum when the voltage VDC is at 50V, allowing a 24V VDC to operate with good scaling on the signal outputs and still providing overhead protection for conditions that may drive the voltage VDC higher. In one embodiment, the VBUS and BEMF reference control circuit 300 may be built from the Shakti-II Motor Control Reference Platform (MCRP), modified for operation at 24V.

Figure 4:
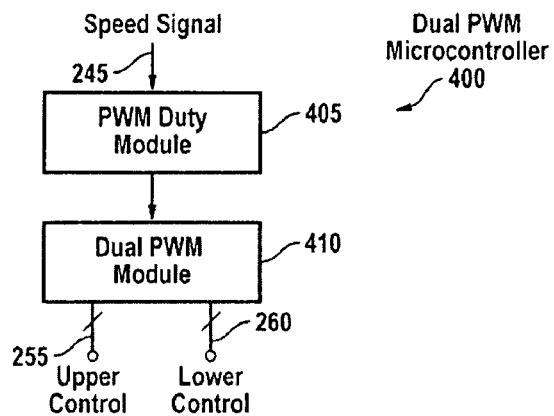
FIG. 4 is a block diagram of a dual PWM microcontroller of the dual PWM control module of FIG. 2, in accordance with an embodiment of the present invention.

FIG. 4 is a block diagram of a dual PWM microcontroller 400 of the dual PWM control module 230, in accordance with an embodiment of the present invention. The dual PWM microcontroller 400 is configured to generate the upper transistor and lower transistor PWM control signals. The dual PWM microcontroller 400 includes a PWM duty module 405 and a dual PWM module 410.

The PWM duty module 405 computes the PWM duty based on a speed control signal 245. For example, if the speed control signal defines 60% of full speed, then in one embodiment the conventional PWM duty applied to the controlled upper transistor or the controlled lower transistor may be 60% PWM. Mathematical computations for determining conventional PWM duty for a BLDC motor are well known. As stated above, in the prior art, only one of the upper driving transistors or one of the lower driving transistors would be controlled by the PWM signal. This would lead to a change in the zero-crossing voltage from ½ VBUS.

Figure 7:
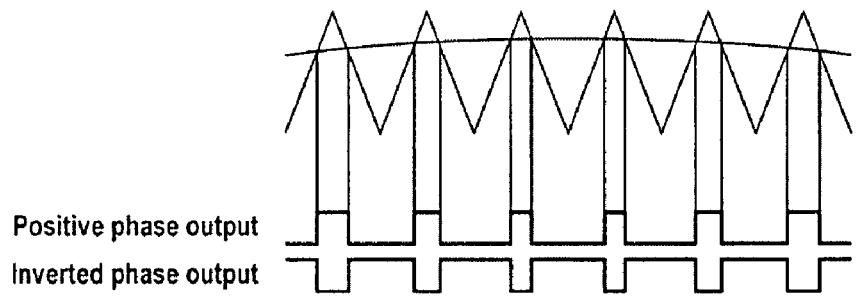
FIG. 7 is a timing diagram illustrating inverted PWM control signals, in accordance with an embodiment of the present invention.

The dual PWM module 410 uses the PWM duty generated by the PWM duty module 405 to generate complementary (inverted as shown in FIG. 7) and symmetrical upper transistor and lower transistor PWM duty cycles and control signals. In one embodiment, the dual PWM module 410 computes the dual PWM duty cycles for each of the upper and lower driving transistors of the inverter circuit 210 to maintain a zero-crossing voltage VZX at ½ VBUS. For example, for 60% PWM, the dual PWM module 410 may drive the upper transistor control signal at 80% PWM and the lower transistor control signal at its complement of 20% PWM. The difference between the PWM duty cycles of the upper and lower driving transistors 210 would be 60%, as computed by the PWM duty module 405. Because the upper and lower driving transistors 210 are receiving complementary PWM control signals, the total PWM duty across the upper and lower driving transistors 210 at any moment is 100% and the zero-crossing voltage VZX remains at ½ VBUS regardless of motor speed. For example, when an upper driving transistor is turned on for a 90% period and off for a 10% period, the lower driving transistor is set to turn off for the same 90% period and on for the same 10% period, making total PWM duty across both driving transistors 210 at any time equal to 100%.

In one embodiment, the dual PWM module 410 computes the dual PWM duty cycles using the following equations:

Vupper=Vneutral+(PWM)(Vneutral);

Vlower=Vneutral−(PWM)(Vneutral);

Dutyupper=VupperNBUS or 50%+½PWM; and

Dutylower=Vlower/VBUS or 50%−½PWM.

For example, to drive the BLDC motor 200 at 20% duty, Vupper=2.5V+20% (2.5V)=3V; Vlower=2.5 V−20% (2.5 V)=2V; Dutyupper=3 V/5 V=60%; and Dutylower=2V/5 V=40%. Thus, one driving transistor is set to a higher level of 60%, and the other driving transistor is set to a lower level of 40%, the difference being 20% and the total being 100%. Thus, in this embodiment, the voltage VBEMF on the winding in tristate can be measured at ½ VBUS.

As noted above, the dual PWM module 410 makes sure that the dual PWM control signals are complementary and symmetrical. By driving the windings complementarily and symmetrically, the voltage VBEMF can be detected more easily on the winding in tristate and switch wear at a particular motor speed is maintained substantially equal to all switches.

In software, symmetrical modulation may be done in a function called commutate( ). Below is an example of how, during one of the six possible commutation steps, symmetrical modulation may be set up between two windings U and V, while the third winding W is in tristate for BEMF detection:

```
//
case STEP1:
    V_duty_cycle=CARRIER_CAL+working_duty;//Phase V is positive
    U_duty_cycle=CARRIER_CAL−working_duty;//Phase U is negative
    trdoer1=0xA5;//Phase W is disconnected.
    break;
//
```

The constant, CARRIER_CAL is set to a level in the PWM range which is at 50% duty. The statement modifying the register "trdoer1" stops the PWM at the W-phase, while it is being observed for the voltage VBEMF. CARRIER_CAL can be adjusted up or down slightly (+/−5% max) to correct small errors that might build up in the tolerance of the resistor-dividers.

In one embodiment, the dual PWM module 410 may modify the PWM duty of the upper and lower driving transistors of the inverter circuit 210 to adjust the zero-crossing voltage from ½ VBUS. In such a case, the total duty may not be 100%. For example, instead of 80%/20% duty cycles which provide a zero-crossing voltage of 2.5V, the dual PWM module 415 might apply 70%/10% duty cycles to adjust the zero-crossing voltage from 2.5V to 2.0V. That is, ½(70%+10%)(VBUS)=40% (VBUS), which for a 5V VBUS provides a modified zero-crossing voltage VZX of 2.0V: For example, if it is determined that the motor speed affects the BEMF constant of the motor, then the zero-crossing voltage VZX may need to be adjusted at the control circuit 300 or by the microcontroller 400. In one embodiment, the zero-crossing voltage VZX may be empirically generated and maintained in a table or other chart.

Figure 5:
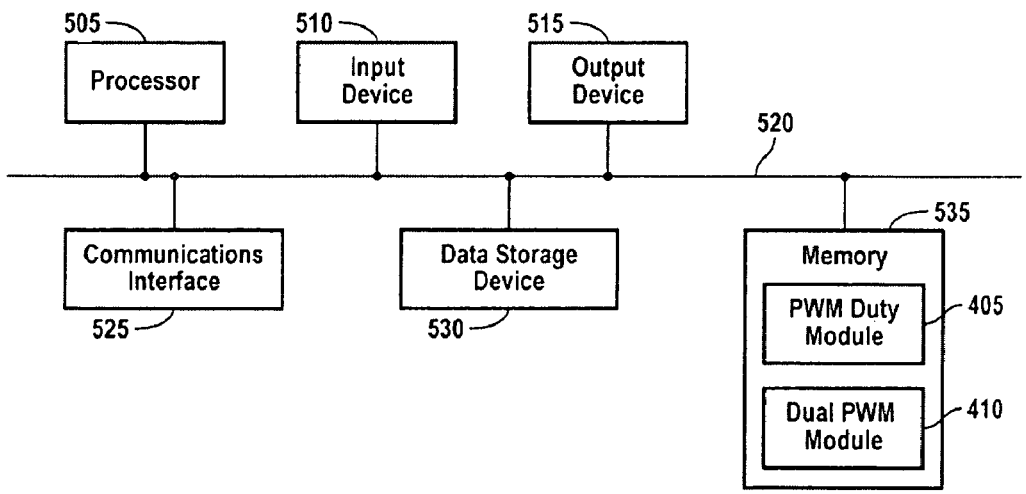
FIG. 5 is a block diagram of a dual PWM microcontroller of the dual PWM control module of FIG. 2, in accordance with another embodiment of the present invention.

FIG. 5 is a block diagram of a dual PWM microcontroller 500 of the dual PWM control module 230, in accordance with another embodiment of the present invention. Microcontroller 500 includes a processor 505 coupled to a communications channel 520. The microcontroller 500 further includes an input device 510, an output device 515, a communications device 525, a data storage device 530, and memory 535, each coupled to the data bus 520. One skilled in the art will recognize that, although the data storage device 530 and memory 535 are illustrated as different units, the data storage device 530 and memory 535 can be parts of the same unit, distributed units, virtual memory, etc. The term "memory" is intended to cover all data storage media whether permanent or temporary. The memory 535 may store the PWM duty module 405 and the dual PWM module 410. It will be appreciated that an embodiment may be implemented on various platforms and operating systems. An embodiment may be written using JAVA, C, C++, and/or other programming languages, possibly using object-oriented programming methodology. The microcontroller 500 may also include additional information, such as network connections, additional memory, additional processors, LANs, input/output lines, the Internet, an intranet, etc. One skilled in the art will also recognize that the programs and data may be received by and stored in the system in a variety of ways.

Figure 6:
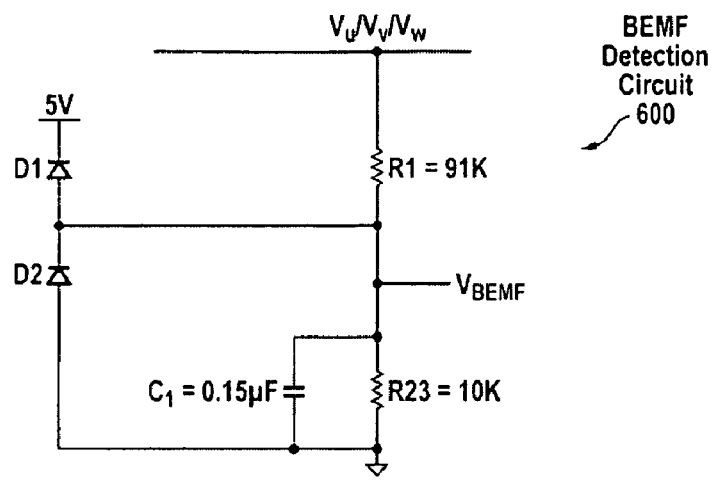
FIG. 6 is a block diagram of the BEMF signal generation circuit of FIG. 2 (where DC voltage VDC is replaced by phase voltages Vu, Vv and Vw), in accordance with an embodiment of the present invention.

FIG. 6 is a block diagram of a BEMF signal generation circuit 600, in accordance with an embodiment of the present invention. It will be appreciated that the BEMF signal generation circuit 240 actually includes three instances of the BEMF signal generation circuit 600 as shown, one for each winding. The BEMF signal generation circuit 600 includes resistor R1 and resistor R23 in series between the voltage Vu, Vv or Vw received from stator 205 and ground. Resistor R1 may be the same resistor as R1 of the control circuit 300 of FIG. 3. Resistor R23 may be a single resistor equal to the combination of resistors R2 and R3 of the control circuit 300 of FIG. 3, e.g., equal to 10KΩ. The point between resistor R1 and resistor R23 is clamped by schottky diodes to 5V and ground and filtered by a capacitor C1 (e.g., 0.015 uF). This added filtering attenuates the PWM component from the windings, leaving the lower frequency BEMF component. The point between resistors R1 and R23 is used as the voltage VBEMF, which is forwarded to the comparator 235 for comparison against zero-crossing voltage VZX. Essentially, the BEMF signal generation circuit 240 rescales the voltages from the windings U, V and W to match the scaled BEMF reference voltage VZX.

Further, as is known in the art, commutating a BLDC motor with moderately high inductance means that there will be inductive effects on the current and voltage waveforms. For current, when transistors are commutated from one phase to another, a certain rise or fall time is required. That is, when a phase is switched off, it takes time for the current to decay. During the decay, an inductive kick forces the voltage of the winding in tristate to one of the power rails. The length of time that the inductive kick happens is proportional to the amount of current to be dissipated, and inversely to the difference in voltage between the phase BEMF and the power rail. The voltage jump is mathematically referred to as DI/DT, since the voltage on an inductor is proportional to the difference in current divided by the difference in time.

Figure 8:
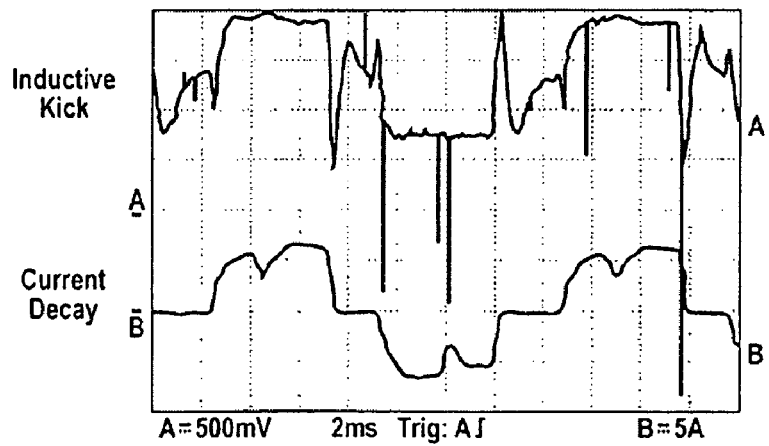
FIG. 8 illustrates an oscillograph of the inductive kick (wave A) and the current decay (wave B), in accordance with an embodiment of the present invention.

FIG. 8 illustrates an oscillograph of the inductive kick (wave A) and the current decay (wave B). As shown, as the current switches, inductive kicks occur.

On an example motor, the DI/DT effects may show up on the BEMF signals as a voltage pulse to the power rail for up to 1.5 ms. This time constant may be much longer than the PWM wavelength (100 usec for 10 kHz), so it will pass through the BEMF filter. This signal could trip the BEMF comparator 235, causing commutation errors (wrong state transition in six step state machine) or oscillation.

Figure 9:
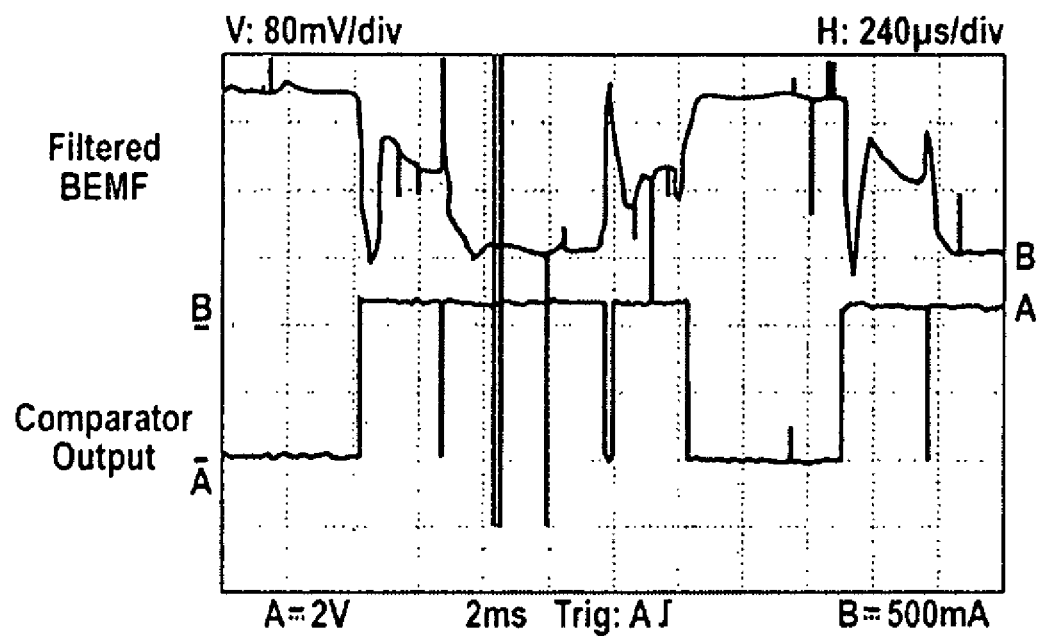
FIG. 9 illustrates an oscillograph of the filtered BEMF signal and the comparator output, in accordance with another embodiment of the present invention.

FIG. 9 illustrates an oscillograph of the filtered BEMF signal (wave B) and the comparator output (wave A). The filtered BEMF signal has large spikes. Thus, the comparator output oscillates between two states. The second and fourth transitions of the comparator output are in error. The DI/DT on the filtered BEMF signal illustrates that the spikes go down after a sustained positive level and go low after a sustained negative level. The plateau areas in the filtered BEMF signal are intervals where the current (not shown) is also the same polarity (positive for positive, negative for negative). It is the discontinuity of this current that creates DI/DT voltage spikes, known as "flyback" or "inductive kick". As large as these voltages seem, they are limited by the power rails. If the DI/DT voltages were not allowed to make these excursions, the current would not dissipate as quickly and the true BEMF voltage would not be visible until after more delay.

Measurements taken under different loads suggest that the DI/DT pulse is proportional to the load. Under low load conditions, the pulse is smaller and the decay time is shorter, so a valid commutation pulse is possible. Under heavy load conditions, the pulse is larger, but shorter in time, such that a valid commutation step is still possible. When the DI/DT pulse happens, the comparator output may be masked and ignored. Accordingly, masking time is important. If the masking time is too short, invalid commutation signals will cause currents to be switched to the wrong phase, decreasing motor efficiency. If the masking time is too long, the commutation rate and thus motor speed will be limited. A timer with definite counts to mask the DI/DT pulses can be used. Once the masking time has passed, the comparator output can be examined for a valid change in step. Once detected, the timer can be set to mask the next DI/DT pulse for the same period of time.

Figure 10:
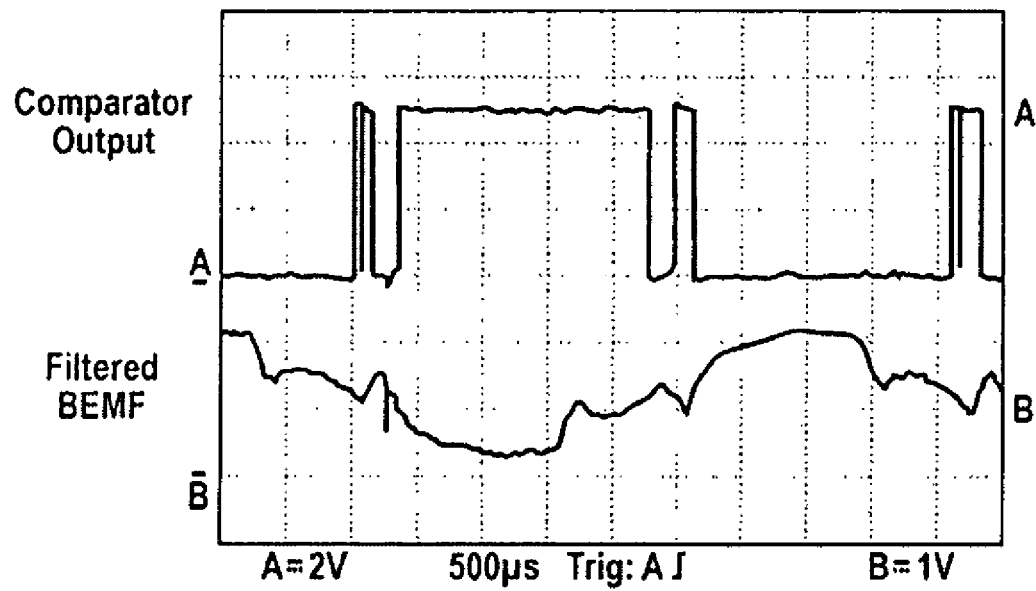
FIG. 10 illustrates an oscillograph of the filtered BEMF signal and the comparator output, in accordance with another embodiment of the present invention.
Figure 11:
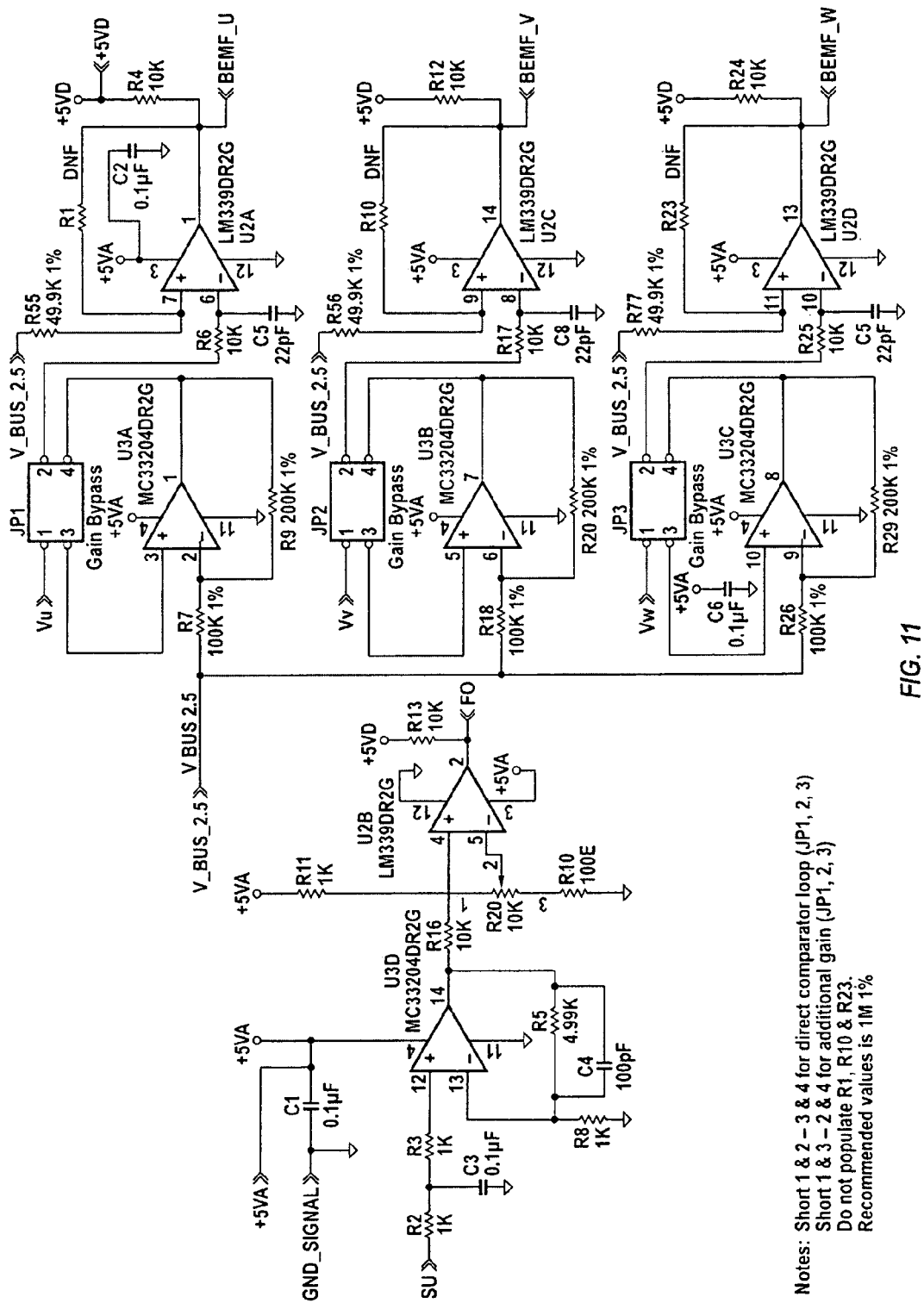
FIGS. 11-14 are circuit schematics that illustrate a motor control circuit built using the Renesas YMCRPR8C25 motor control evaluation kit, in accordance with an embodiment of the present invention.
Figure 12A:
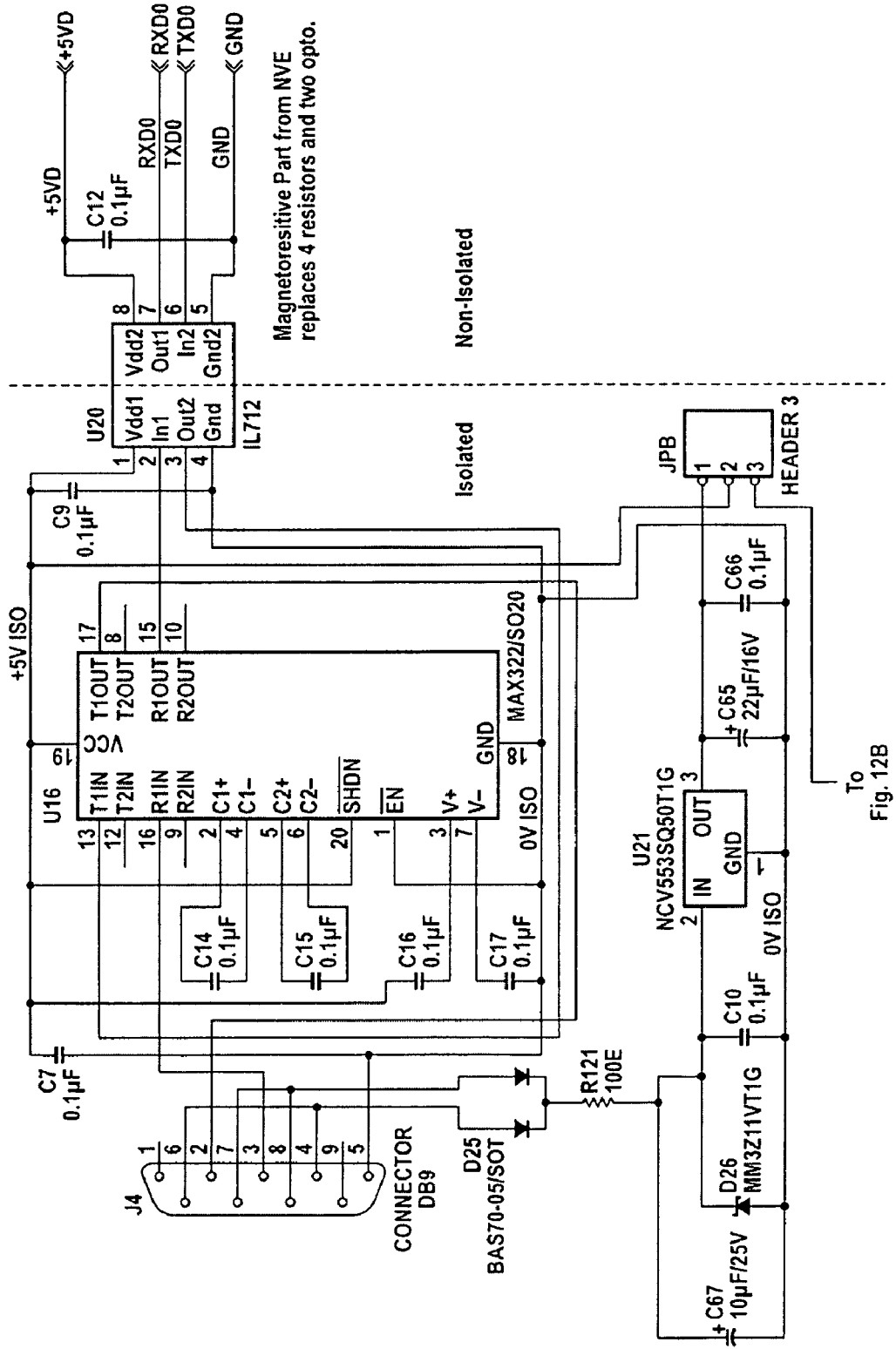
Figure 12B:
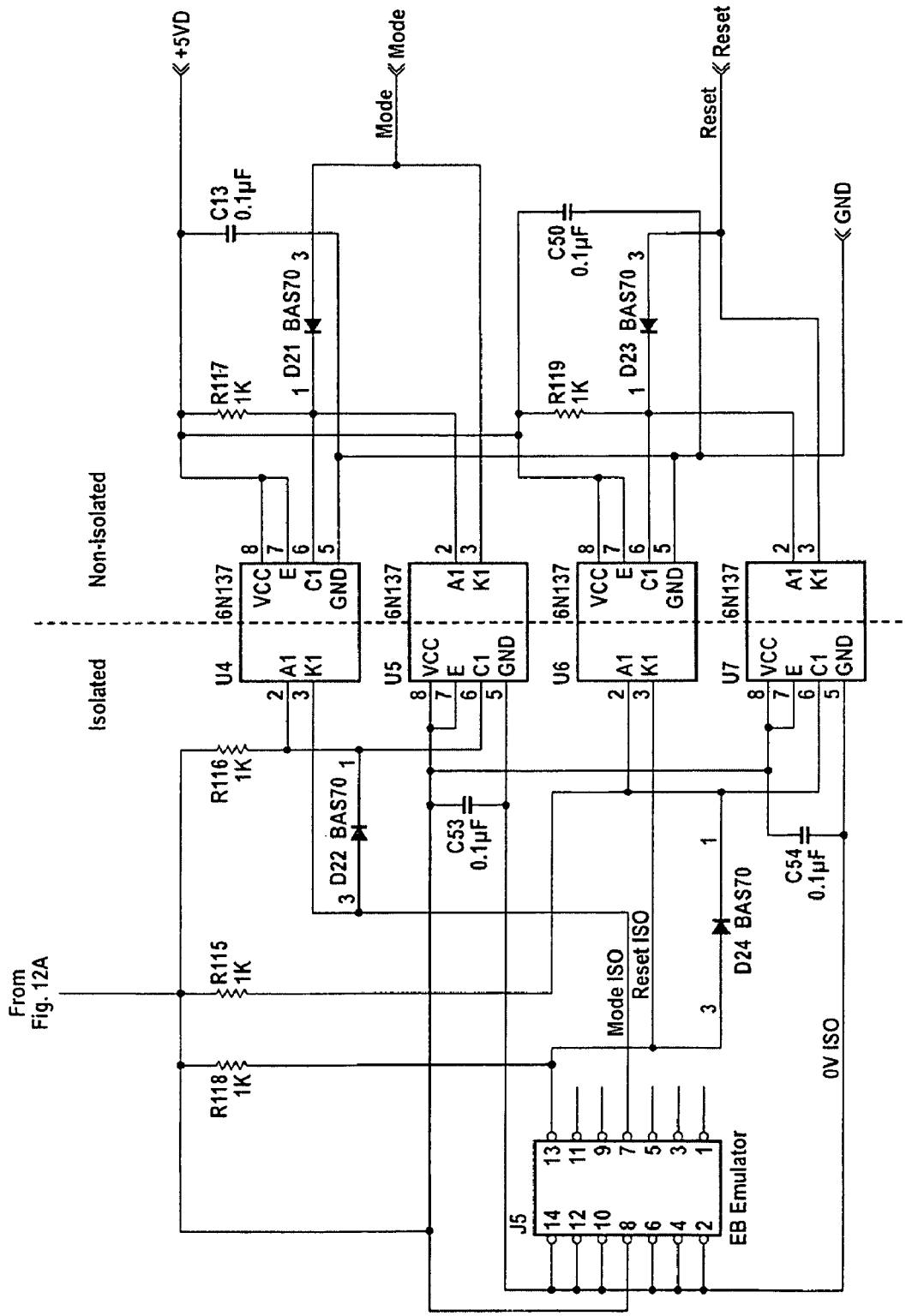
Figure 13A:
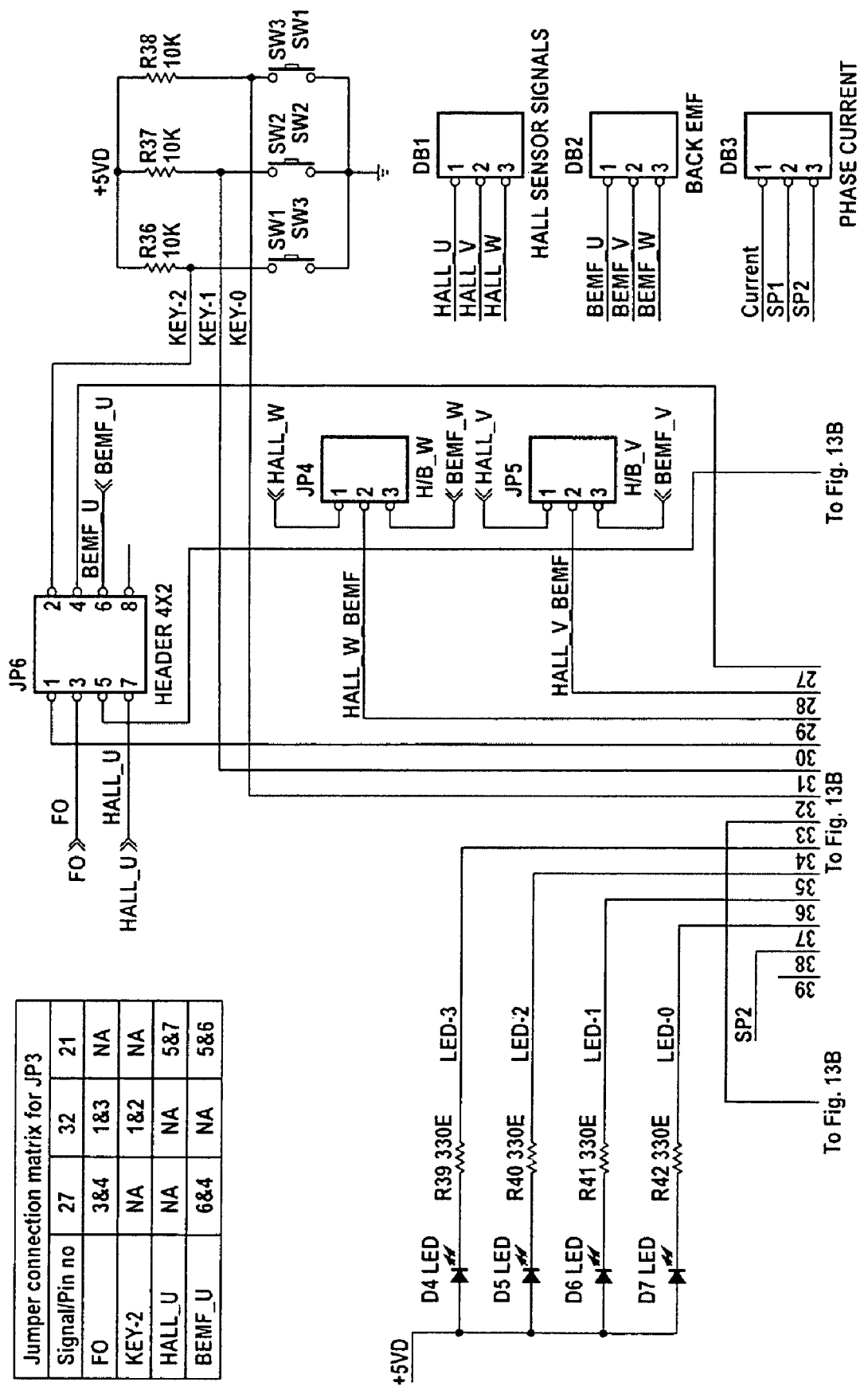
Figure 13B:
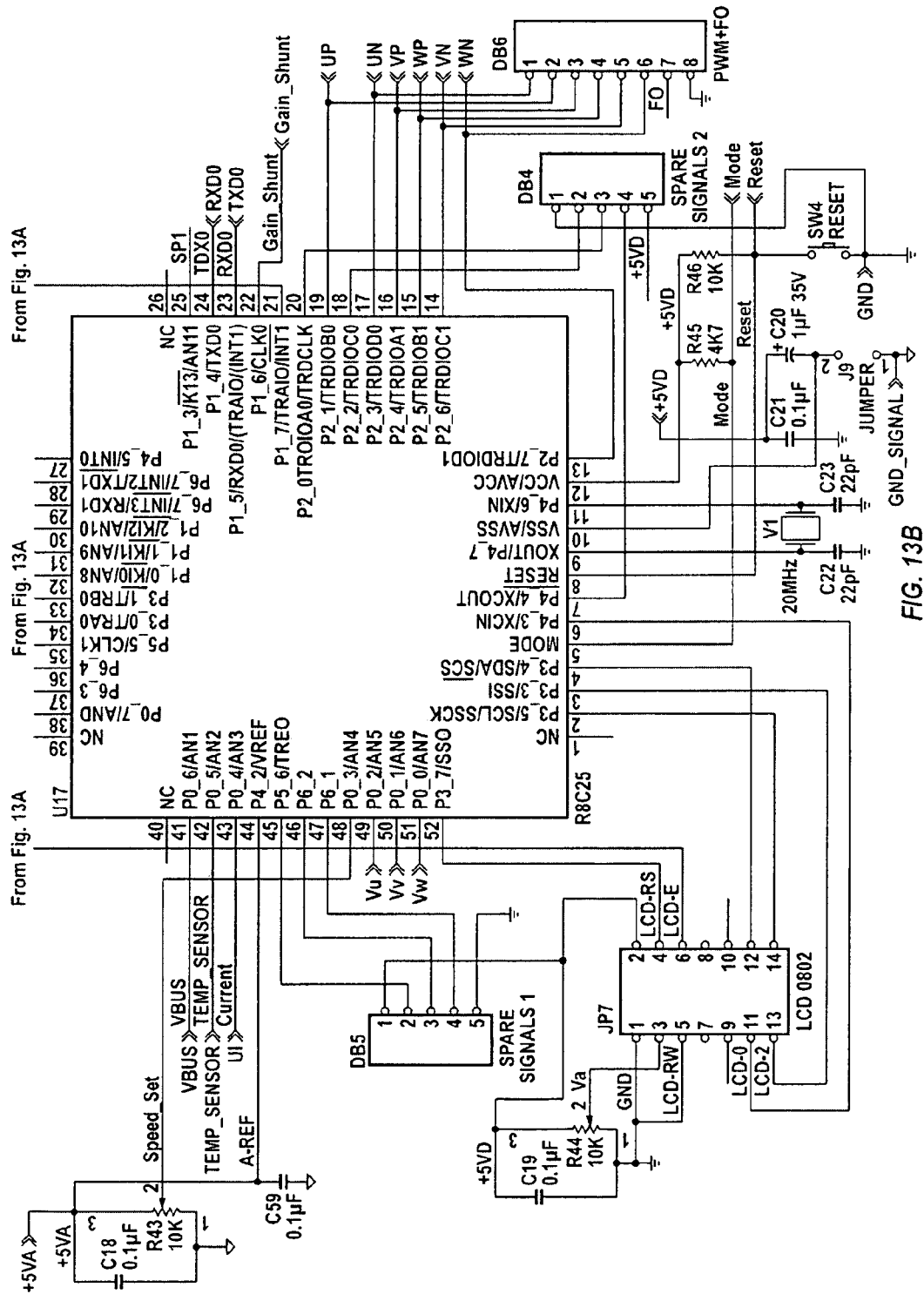
Figure 14A:
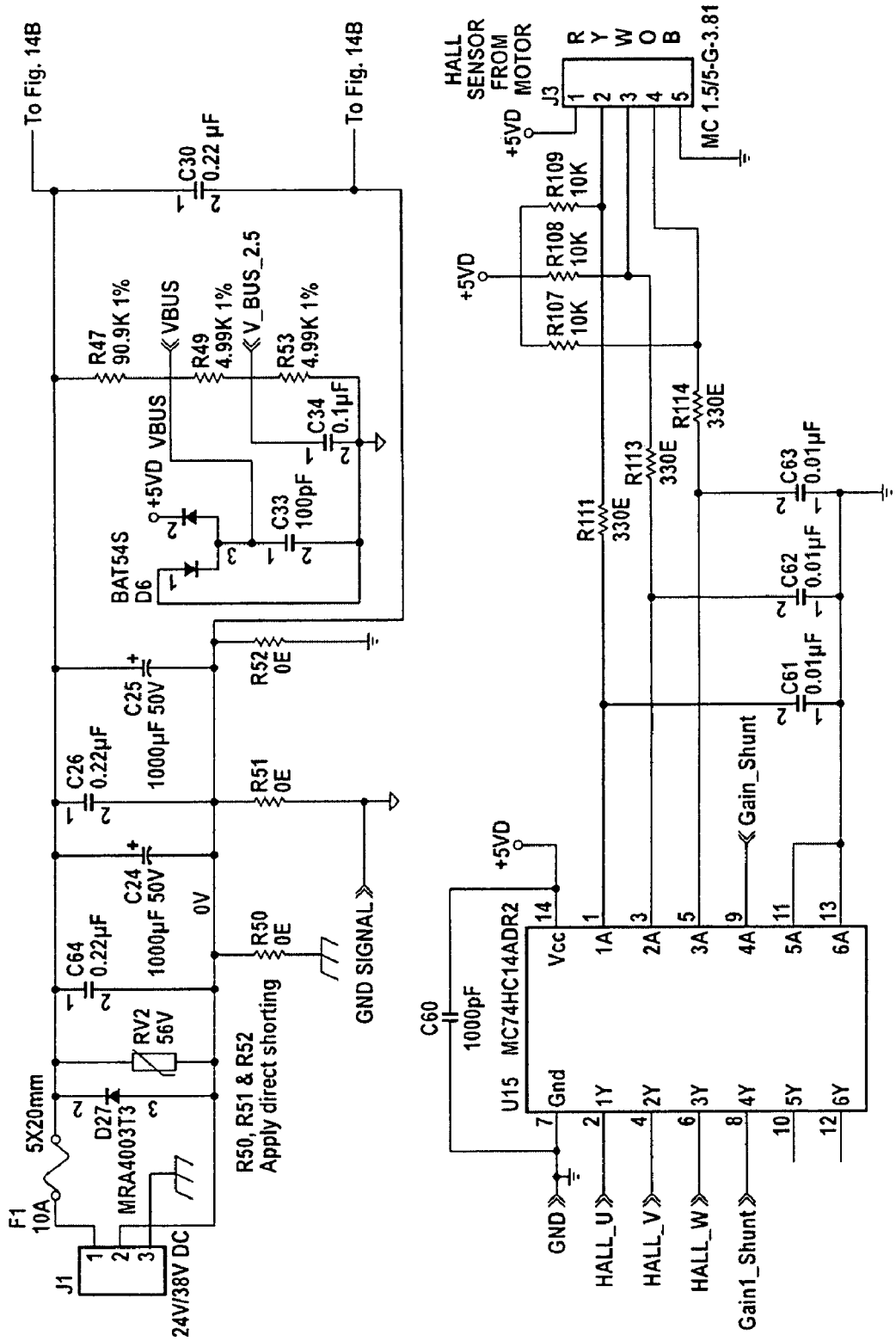
Figure 14B:
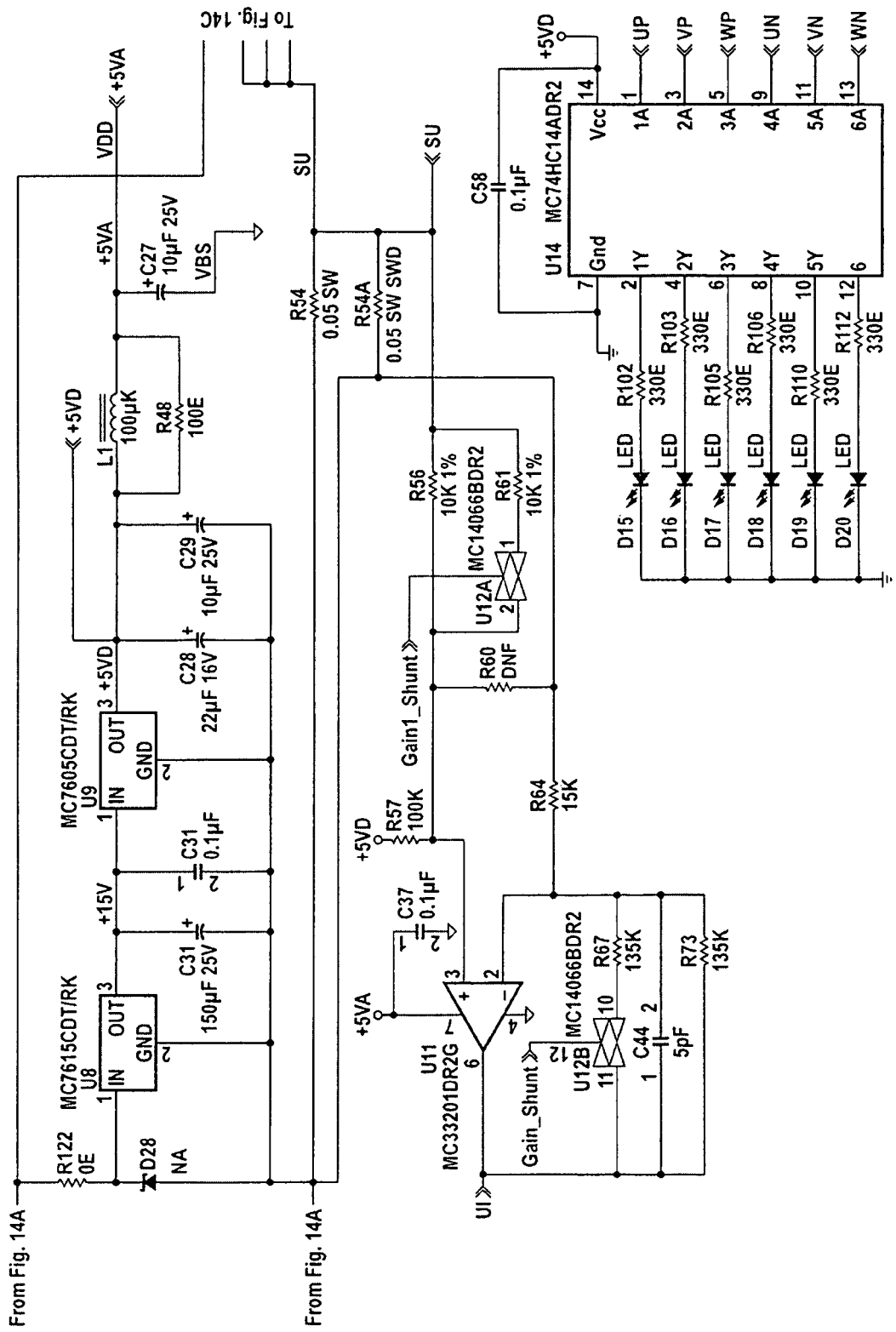
Figure 14C:
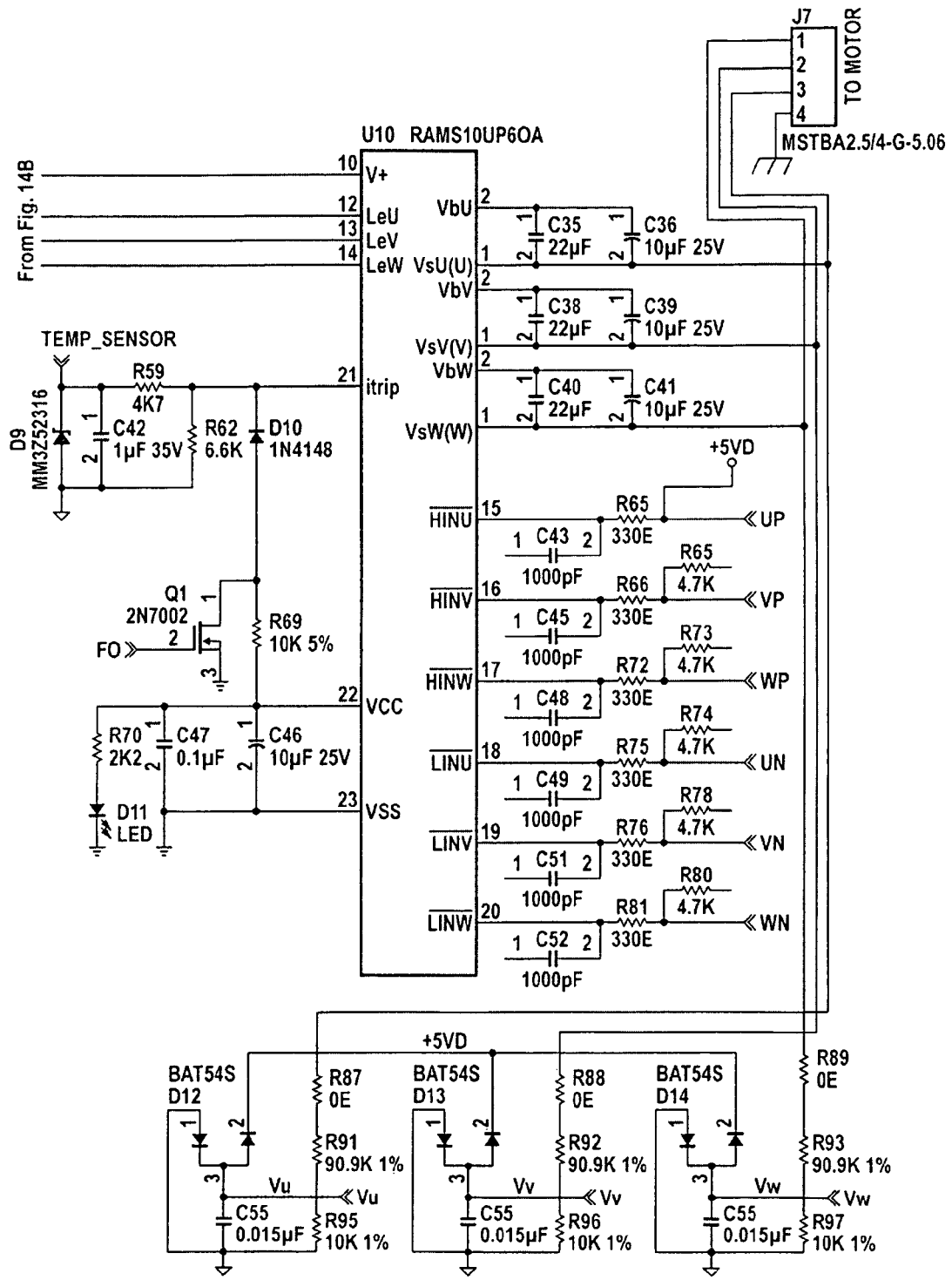

FIG. 10 is a graph showing the comparator output (wave A), including the DI/DT spike to be masked. The comparator output has extra edges. The first edge is valid, the next two or three quickly following are invalid. As shown, the invalid pulse is sustained for about 500 us after the valid edge. This extra pulse happens on all three comparators, so the masking delay can be used at each transition. Even with a 1 ms mask time, the total time looking for transitions is $\frac{1}{3}^{rd}$ of the total time, since the rest of the time the signals may be ignored.

The foregoing description of the preferred embodiments of the present invention is by way of example only, and other variations and modifications of the above-described embodiments and methods are possible in light of the foregoing teaching. For example, although the program components are being described on a single site, one skilled in the art will recognize that these components may be on multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A DC motor, comprising:
   a stator having at least three windings coupled to a neutral point;
   a first pair of upper and lower switches for driving a first winding of the at least three windings to a first voltage or in tristate;
   a second pair of upper and lower switches for driving a second winding of the at least three windings to a second voltage or in tristate;
   a third pair of upper and lower switches for driving a third winding of the at least three windings to a third voltage or in tristate, one of the first, second or third windings being in tristate;
   a back electro-motive force (BEMF) signal generation circuit coupled to receive a BEMF voltage from the winding in tristate;
   a comparator coupled to receive the BEMF voltage and a zero-crossing voltage representing the voltage at the neutral point at a predetermined time and for comparing the BEMF voltage and the zero-crossing voltage to generate a comparison result;
   a zero-crossing voltage generation circuit to output the zero-crossing voltage to the comparator; and
   a commutation controller coupled to receive the comparison result and a speed control signal and for using the comparison result and the speed control signal to generate complementary pulse width modulated (PWM) control signals, one of the complementary PWM control signals for controlling an upper switch and the other of the complementary PWM control signals for substantially simultaneously controlling a lower switch.

2. The DC motor of claim 1, wherein the first voltage is one of a low or a high voltage, the second voltage is one of the low or the high voltage, and the third voltage is one of the low or the high voltage.

3. The DC motor of claim 1, wherein the first winding, the second winding and the third winding each have the same impedance.

4. The DC motor of claim 1, wherein the predetermined time is the time when zero-voltage is being driven across the winding in tristate.

5. The DC motor of claim 4, wherein
   the first winding is driven by a high voltage,
   the second winding is driven by a low voltage,
   the first winding, the second winding and the third winding each have the same impedance, and
   the zero-crossing voltage is defined as approximately ½ the voltage across the first winding and the second winding.

6. The DC motor of claim 1, wherein the complementary PWM control signals have substantially 100% duty across them at all times.

7. The DC motor of claim 1, wherein the complementary PWM control signals have a difference in duty relative to the speed control signal.

8. The DC motor of claim 1, wherein the zero-crossing voltage is determined from an empirically generated chart.

9. The DC motor of claim 1, wherein the commutation controller applies PWM control signals to the upper and lower switches substantially symmetrically for a given speed, thus causing switch wear to be substantially equal to all switches.

10. The DC motor of claim 1, further comprising an open loop commutation controller for controlling the first pair of switches, the second pair of switches, and the third pair of switches until the BEMF voltage is sufficient for the BEMF detection circuit to detect.

11. In a DC motor with a stator having at least three windings coupled to a neutral point, a method comprising:
    driving a first winding of the at least three windings to a first voltage or in tristate by a first pair of upper and lower switches,
    driving a second winding of the at least three windings to a second voltage or in tristate by a second pair of upper and lower switches;
    driving a third winding of the at least three windings to a third voltage or in tristate by a third pair of upper and lower switches, one of the first, second or third windings being in tristate;
    receiving a back electro-motive force (BEMF) voltage from the winding in tristate;
    receiving a zero-crossing voltage representing the voltage at the neutral point at a predetermined time;
    comparing the BEMF voltage and the zero-crossing voltage to generate a comparison result;
    receiving a speed control signal;
    using the comparison result and the speed control signal to generate complementary pulse width modulated (PWM) control signals;
    using one of the complementary PWM control signals to control an upper switch; and
    using the other of the complementary PWM control signals to substantially simultaneously control a lower switch.

12. The method of claim 11, wherein the first voltage is one of a low or a high voltage, the second voltage is one of the low or the high voltage, and the third voltage is one of the low or the high voltage.

13. The method of claim 11, wherein the first winding, the second winding and the third winding each have the same impedance.

14. The method of claim 11, wherein the predetermined time is the time when zero-voltage is being driven across the winding in tristate.

15. The method of claim 14, wherein
    the first winding is driven by a high voltage,
    the second winding is driven by a low voltage,
    the first winding, the second winding and the third winding each have the same impedance, and
    the zero-crossing voltage is defined as approximately ½ the voltage across the first winding and the second winding.

16. The method of claim 11, wherein the complementary PWM control signals have substantially 100% duty across them at all times.

17. The method of claim 11, wherein the complementary PWM control signals have a difference in duty relative to the speed control signal.

18. The method of claim 11, wherein the zero-crossing voltage is determined from an empirically generated chart.

19. The method of claim 11, further comprising applying the PWM control signals to the upper and lower switches substantially symmetrically for a given speed, thus causing switch wear to be substantially equal to all switches.

20. The method of claim 11, further comprising controlling the first pair of switches, the second pair of switches, and the third pair of switches using an open loop commutation controller until the BEMF voltage is sufficient for the BEMF detection circuit to detect.

* * * * *